United States Patent [19]

Suzuki et al.

[11] Patent Number: 5,066,968
[45] Date of Patent: Nov. 19, 1991

[54] AUTOFOCUSING SYSTEM FOR A CAMERA

[75] Inventors: Noboru Suzuki; Shigeo Toji, both of Tokyo; Masahiro Kawasaki, Saitama, all of Japan

[73] Assignee: Asahi Kogaku Kogyo Kabushiki Kaisha, Tokyo, Japan

[21] Appl. No.: 414,477

[22] Filed: Sep. 29, 1989

[30] Foreign Application Priority Data

Sep. 29, 1988 [JP] Japan .................. 63-245683
Sep. 29, 1988 [JP] Japan .................. 63-245684

[51] Int. Cl.⁵ .......................................... G03B 13/00
[52] U.S. Cl. ............................. 354/400; 354/195.12
[58] Field of Search .............. 354/402, 400, 195.1, 354/195.12

[56] References Cited

U.S. PATENT DOCUMENTS

| 3,972,056 | 7/1976 | Tsujimoto | 354/402 |
| 4,509,842 | 4/1985 | Taniguchi et al. | 354/402 |
| 4,560,267 | 12/1985 | Nakai et al. | 354/412 |
| 4,623,238 | 11/1986 | Taniguchi et al. | 354/406 |
| 4,885,600 | 12/1989 | Iwasa et al. | 354/400 |

FOREIGN PATENT DOCUMENTS

| 53-113527 | 10/1978 | Japan . |
| 58-103273 | 6/1983 | Japan . |
| 62-133430 | 6/1987 | Japan . |
| 62-133431 | 6/1987 | Japan . |
| 62-200340 | 9/1987 | Japan . |
| 63-005331 | 1/1988 | Japan . |
| 63-189817 | 8/1988 | Japan . |
| 63-220118 | 9/1988 | Japan . |
| 64-044428 | 2/1989 | Japan . |
| 64-044429 | 2/1989 | Japan . |
| 64-056406 | 3/1989 | Japan . |
| 64-062608 | 3/1989 | Japan . |
| 64-079713 | 3/1989 | Japan . |
| 199012 | 4/1989 | Japan . |
| 1099011 | 4/1989 | Japan . |
| 1123206 | 5/1989 | Japan . |
| 1131509 | 5/1989 | Japan . |

Primary Examiner—Brian W. Brown
Assistant Examiner—David M. Gray
Attorney, Agent, or Firm—Sandler, Greenblum & Bernstein

[57] ABSTRACT

An autofocusing system for a camera having a photographic lens including a focusing lens group and a zooming lens group, and a focus-lock means for inhibiting the driving of the focusing lens group once the photographic lens is brought into an in-focus condition. However, when the zooming lens group is thereafter driven, a re-focusing operation, or focus-correction operation, is executed.

46 Claims, 11 Drawing Sheets

AUTOFOCUSING SYSTEM FOR A CAMERA

RELATED APPLICATIONS

This application is generally related to commonly assigned U.S. patent application, informal Ser. No. 410,880, filed on Sept. 22, 1989, in the names of Noboru Suzuki, Shigeo Toji, and Masahiro Kawasaki, and entitled "Image Magnification Control Device for a Camera"; and this previously filed application is expressly incorporated by reference herein in its entirety.

BACKGROUND OF THE INVENTION

The present invention relates to an autofocusing system in the macro zone of a zoom lens.

With the progress of electronic technology, there have recently been developed varieties of automatic focusing camera equipped with power zoom lenses whose zooming lens group is driven by a drive means, such as a motor.

Some autofocusing systems of the sort mentioned above have a so-called "focus-lock function", in which if a photometric switch is actuated after an in-focus state is established by means of the autofocusing system, the operation of the autofocusing system can be suspended until the suspension of the operation is released, for the purpose of allowing a photographer to determine a composition in the finder.

With a zoom lens mounted on a camera equipped with an autofocusing system having such a focus-lock function, however, it is generally desired that zooming be executed even in the aforementioned focus-lock state.

On the other hand, the zooming lens group is designed to form an image of an object on a film at all times if it is in a zooming zone. Nevertheless, the zooming operation, when performed, may cause a deviation, depending on the zooming lens group, from the proper image-forming position for reasons of e.g., the process of manufacturing of the lens.

For the reason set forth above, the in-focus state is not always maintainable when the zoom lens in the in-focus state brought about by the autofocusing system, is moved. If a picture is taken in that condition, blurring of the image may occur.

SUMMARY OF THE INVENTION

It is therefore an object of the present invention to provide an autofocusing system for a camera capable of preventing an out-of-focus picture from being taken, even though zooming is executed after an in-focus state has been established in a camera equipped with such an autofocusing system.

For the above purpose, according to the present invention, there is provided an autofocusing system for a camera having a photographic lens including a focusing lens group and a zooming lens group, the system comprising:

focus-drive means for driving the focusing lens group for focusing;
 zoom-drive means for driving the zooming lens group for zooming;
 focus-lock means for disabling the focus-drive means if the photographic lens has been brought into an in-focus condition; and
 re-focus means for re-enabling the focus-drive means when the zooming lens group is driven by the zoom-drive means after the focus-drive means is disabled by the focus lock means.

Optionally, the above system further comprises means for detecting defocus information by using light which has passed through the photographic lens, with the focus-drive means driving the focusing lens group depending upon the defocus information, wherein defocus information is detected again by the defocus information detecting means when the focus-drive means is enabled by the re-focus means.

The term "defocus information" represents both an amount and a direction of the focus of a photographic lens with respect to an ideal focal plane. The term "defocus amount dx" corresponds to the above "defocus information"; and, accordingly, the "defocus amount dx" can be either a positive or negative value.

According to another aspect of the invention, there is provided an autofocusing system for a camera having a photographic lens including a focusing lens group and a zooming lens group, comprising:

focus-drive means for driving the focusing lens group for focusing;
 zoom-drive means for driving the zooming lens group for zooming;
 focus-lock means for disabling the focus-drive means once the photographic lens is brought into an in-focus condition;
 memory means for storing data pertaining to the relationship between the focal length of the photographic lens, and a focus correction amount corresponding to the focal length; and
 focus correcting means for enabling the focus-drive means so as to drive the focusing lens group, depending upon the data stored in the memory means when the zooming lens group is driven by the zoom-drive means after the focus-drive means has been disabled by the focus lock means.

Optionally, the focus-drive means comprises a pulse motor and the focus correction amount comprises a number of pulses by which the pulse motor is operated.

Further, and optionally, the camera comprises a camera body and a lens unit that is interchangeably mounted to the camera body, wherein the memory means comprises a read-only-memory that is installed in the lens unit for storing data inherent to the lens unit.

DESCRIPTION OF THE ACCOMPANYING DRAWINGS

DESCRIPTION OF THE EMBODIMENTS

Referring to the accompanying drawings, a description will subsequently be given of an embodiment of the present invention that is applied to an automatic single-lens reflex camera. The present invention is, needless to say, applicable to not only a compact camera with a lens unit incorporated in its camera body, but also to a still video camera or the like.

Figure 1:
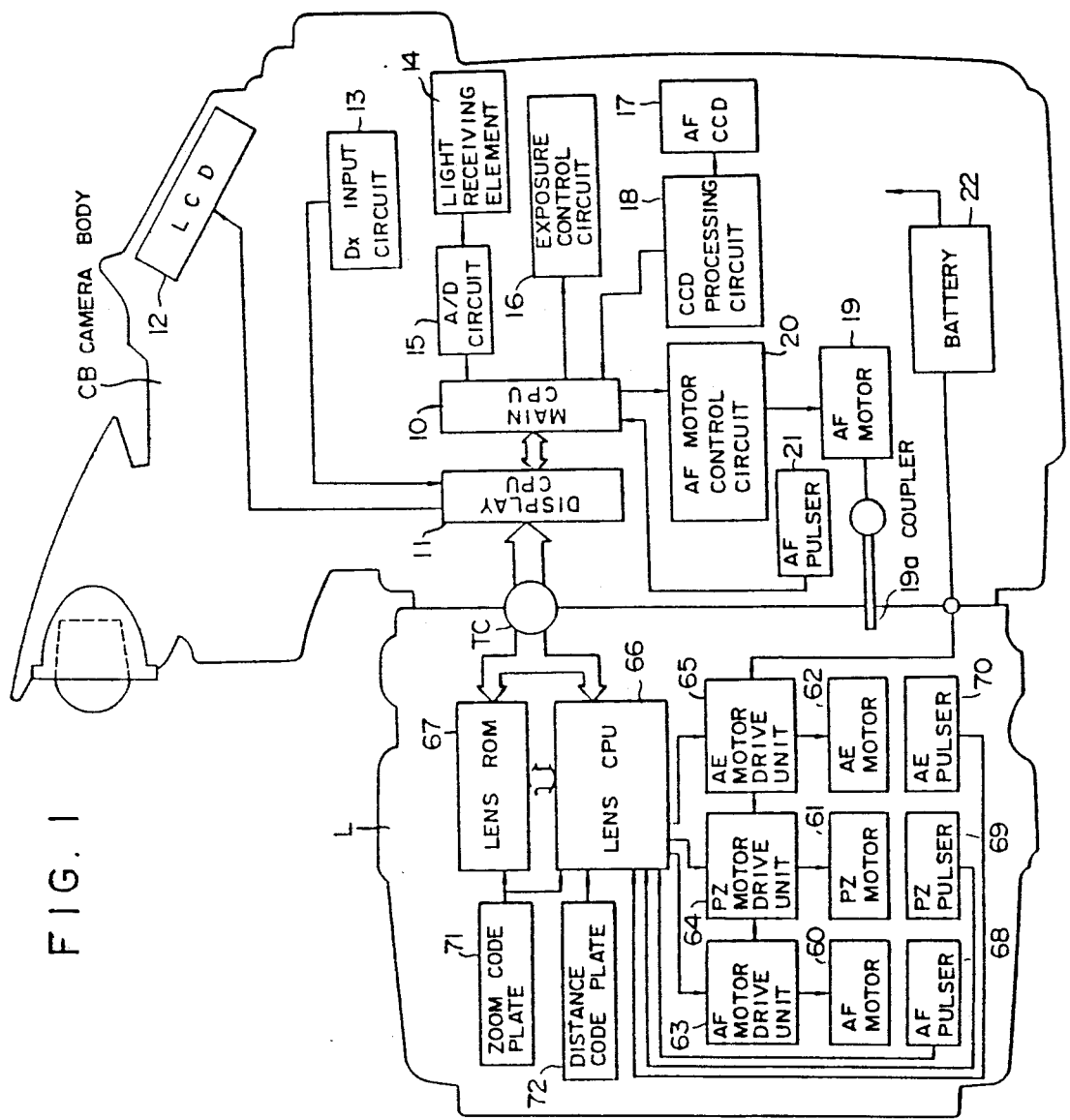
FIG. 1 shows a block diagram illustrating a system configuration.

Camera body CB of an automatic single-lens reflex camera has a known construction in that it may be fitted with various kinds of interchangeable photographic lenses, as illustrated in FIG. 1, and because a power zoom type photographic lens L is mounted in the camera body CB.

FIG. 1 is a block diagram of a system which combines a photographic lens L with a camera body CB.

The camera body CB is equipped with two CPUs: a main CPU 10 for processing various kinds of photographic data; and a display CPU 11 for receiving data from a plurality of switches, transmitting and receiving data to and from the photographic lens L, and displaying the data.

With these CPUs as the main components, the camera body CB further comprises an LCD panel 12 for displaying various kinds of data, a DX code input circuit 13 for receiving the ISO (International Standard Organization) sensitivity of a film to be used, based on a DX code printed on a film cassette, a light receiving element 14 for measuring the luminance of an object by a luminous flux incident to the photographic lens L, an A/D (Analog/Digital) converter 15 for subjecting the output of the light receiving element to A/D conversion, an exposure control circuit 16 for controlling a shutter on the basis of various photographic conditions, an AF CCD 17 for receiving an optical image of the object formed by the luminous flux incident on the photographic lens L, and a CCD processing circuit 18 for detecting the in-focus state of the photographic lens L from the output of the AF CCD 17.

An automatic focusing (AF) motor 19 is used for focusing the photographic lens, together with an AF motor control circuit 20 for driving the AF motor 19 by computing the output of the CCD processing circuit 18, and an AF pulser 21 for detecting the drive amount of the AF motor 19, whose pulses are used for transmitting a driving force to the photographic lens L via a coupler 19a provided at a mounting port when the photographic lens L of a conventional type, without an AF motor, is mounted.

However, the AF motor 19 is not used in a case such as shown in FIG. 1.

A battery 22 is designed to the supply power to motors, which will be described later, within the photographic lens L, and to a CPU, in addition to each active element in the camera body CB.

The photographic lens L incorporates three motors: an AF motor 60, a power zoom (PZ) motor 61 and an automatic exposure (AE) control motor 62, whereby the driving force within the lens can be appropriated for automatic focusing, power zooming and exposure control.

The photographic lens L has cam mechanisms similar to those of a conventional type lens for effecting focusing and zooming by means of cam rings to move each of the lens groups relative to the optical axis, the aforementioned AF motor 60 and the PZ motor 61 being used for driving the cam rings to rotate.

These motors are controlled by a lens CPU 66 via an AF motor drive unit 63, a PZ motor drive unit 64 and an AE motor drive unit 65, respectively.

Data input means for the lens CPU 66 comprises a lens ROM 67 as means for storing data inherent to the lens; an AF pulser 68, a PZ pulser 69 and an AE pulser 70 for detecting the drive amounts of the respective motors, in the form of pulses; and a zoom code plate 71 and a distance code plate 72 for detecting the respective revolved positions of the zooming and focusing cam rings.

The code plate actually comprises a code plate that is secured to the cam ring and a plurality of brushes that are in slidable contact with the code plate fitted to the fixed ring and arranged so that the absolute revolved position of each cam ring is detected from the position in which the brushes come into contact therewith. However, the term "code plate" as used herein, is a general term given to this class of apparatus for convenience purposes.

The lens CPU 66 is coupled to the control subjects and the input means, and is also capable of communicating with the camera body CB via groups of electric contacts TC as will be described later; e.g., it functions as means for computing the aforesaid drive amount while referring to the data stored in the lens ROM 67 upon receipt of the defocus amount detected on the camera body CB side, for driving the AF motor 60 while detecting the drive amount using the AF pulser 68, and for driving the AE motor 62 to rotate while detecting the drive amount using the AE pulser 70, all on the basis of the exposure value determined on the camera body CB side.

Figure 2:
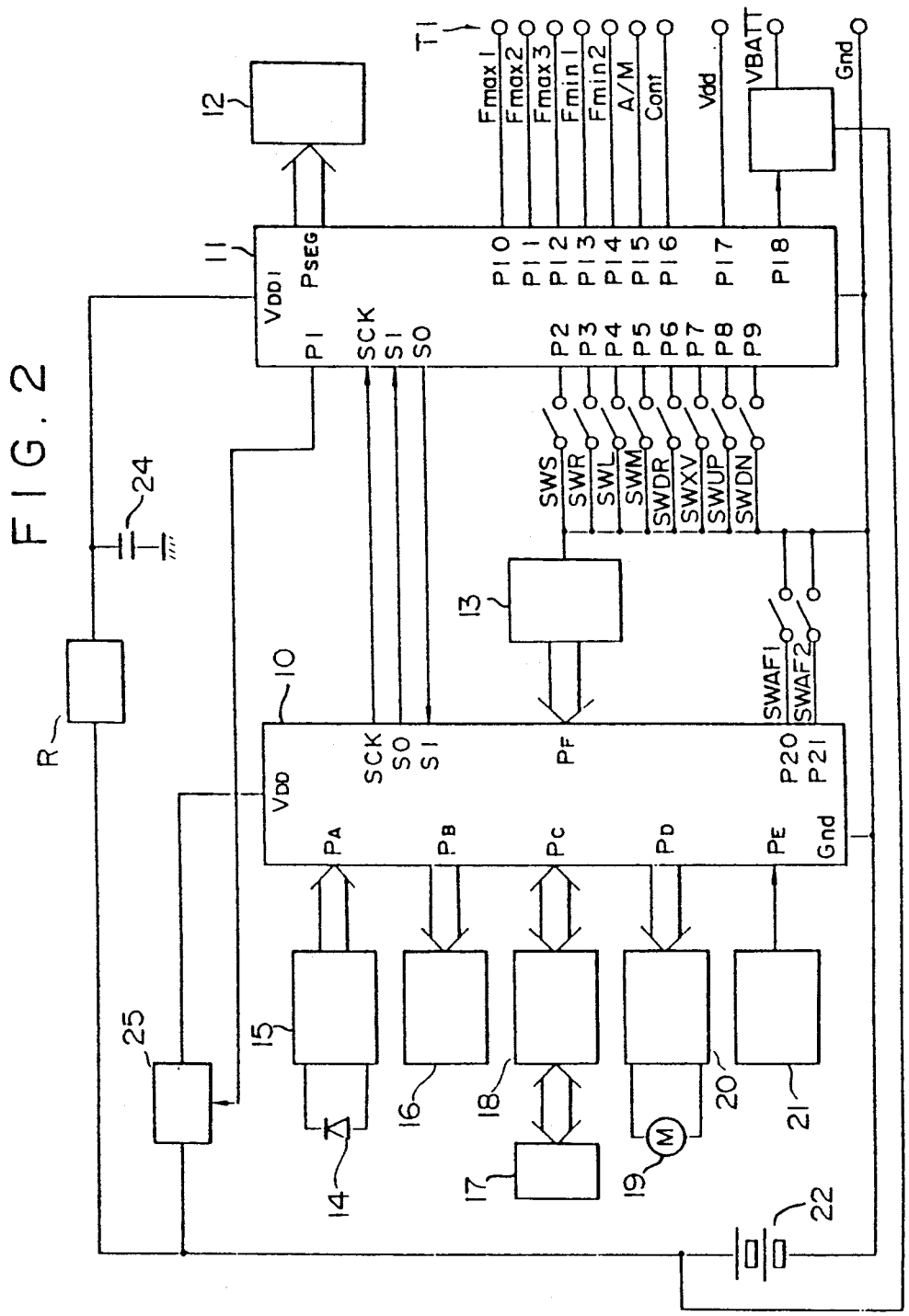
FIG. 2 shows a diagram of a circuit in a camera body.

A group of 10 electric contacts T1 are provided at the lens mounting port of the camera body CB in such a state that these contacts are insulated from the mounting surface of the camera body mounting ring (see FIG. 2).

Figure 3:
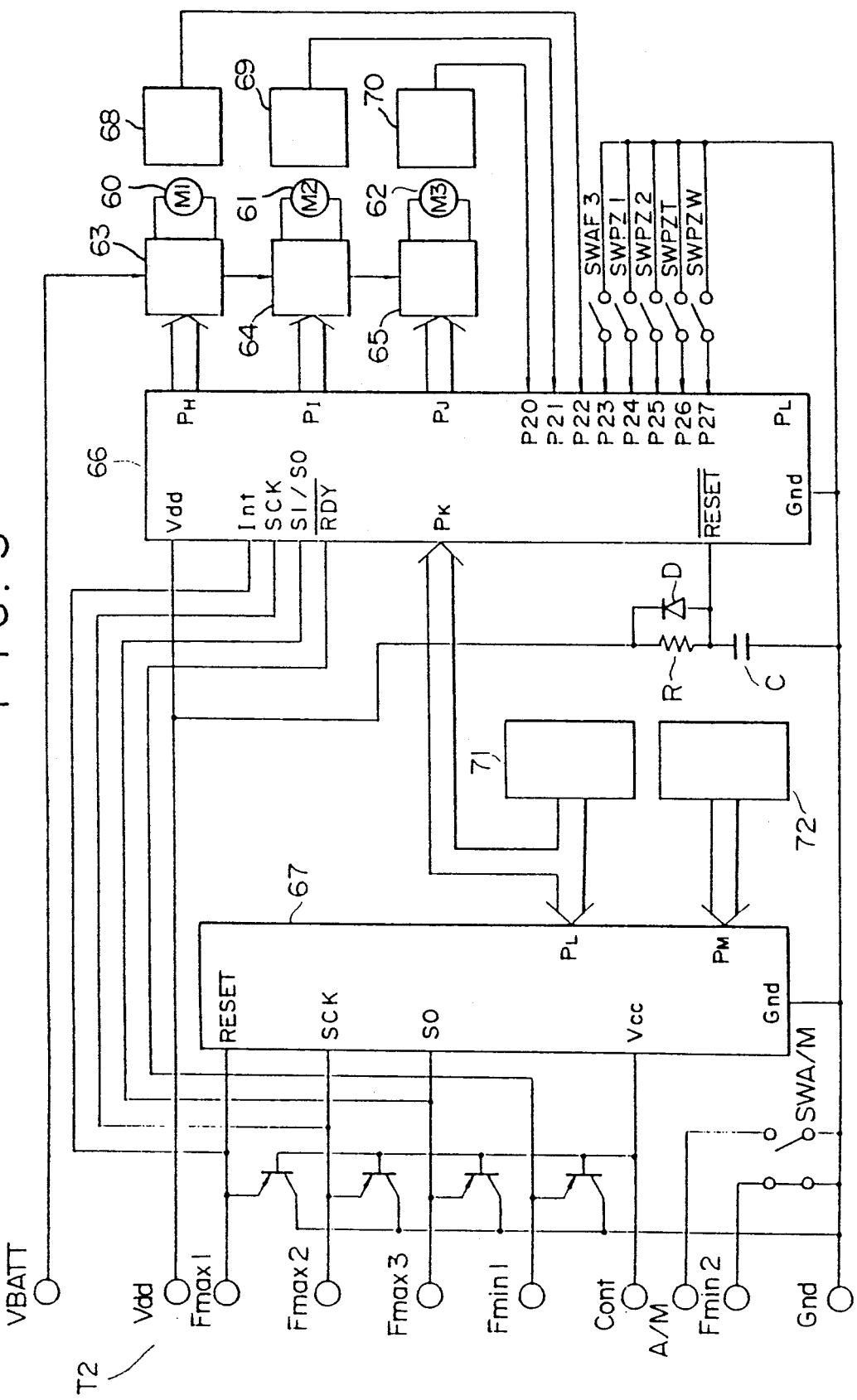
FIG. 3 shows a diagram of a circuit in a lens unit.

On the other hand, a group of electric contacts T2, corresponding to the group of electric contacts T1 provided on the camera body CB side, are provided on the mounting portion of the photographic lens L (FIG. 3).

When the photographic lens L is mounted onto the camera body CB, the groups of electric contacts T1, T2 make contact with their respective counterparts to form the aforementioned groups of electric contacts TC.

Referring to detailed circuit diagrams, this system will now be described further.

FIG. 2 shows a circuit diagram in the camera body CB.

The voltage of battery 22 is applied, after being transformed by a regulator R and backed up by a super capacitor 24, to terminal VDD1 of the display CPU 11, which is always operated at a constant voltage.

Moreover, terminal P1 of display CPU 11 is connected to: a DC/DC converter 25 for turning ON and OFF the power supply of the main CPU 10; terminal P2 is connected to a photometric switch SWS which is turned ON when a shutter button is depressed halfway; terminal P3 is connected to a release switch SWR which is turned ON when the shutter button is fully depressed; and terminal P4 is connected to a lock switch SWL which is turned ON when the camera is set to a photographic condition. The data from each switch is thus supplied to the display CPU 11.

The photometric switch SWS represents the focus-lock switch recited in the present invention, and each lens group in the in-focus state is held until it is released therefrom to effect a focus-lock by turning ON the photometric switch SWS during the automatic focusing process in the power-zooming and focus priority modes.

The DC/DC converter 25 supplies power to terminal VDD of the main CPU 10 to operate the main CPU when the photometric switch SWS is turned ON while the lock switch SWL is held ON.

Terminal P5 of the display CPU 11 is connected to a mode switch SWM for selecting one of several photographic modes i.e., an auto and manual photographic mode; terminal P6 is connected to a drive switch SWDR for selecting either a single shot or a sequential-shot mode when switch SWDR is turned ON; and terminal P7 is connected to an exposure correction switch SWXV for correcting the set exposure while the switch SWXV is held ON. Each setting can be altered by operating an up-count switch SWUP connected to terminal P8, or a down-count switch SWDN connected to terminal P9, while switches connected to the terminals P5–P7 are held ON.

A group of terminals PSEG are used to drive LCD panel 12 to display stored data when the lock switch SWL is turned ON.

A group of contacts PA of the main CPU 10 are connected to a photometric A/D circuit 15; a group of contacts PB are connected to an exposure circuit 16; a group of contacts PC are connected to the CCD processing circuit 18; a group of contacts PD are connected to the AF motor control circuit 20; a group of contacts PE are connected to the AF pulser 21; and a group of contacts PF are connected to the DX code input circuit 13.

As set forth above, the A/D circuit 15 is connected to the photometric light receiving element 14; the CCD processing circuit 18 is connected to the AF CCD 17; and the AF motor control circuit 20 is connected to the AF motor 19 within the camera body CB.

Terminal P20 of the main CPU 10 is connected to a first autofocusing switch SWAF1 for switching from an auto mode, wherein focusing is effected by driving the AF motor, to a manual mode wherein it is effected manually and vice versa; whereas terminal P21 is connected to a second autofocusing switch SWAF2 for switching the priority given to focusing to what is given to releasing in a shutter release mode.

FIG. 3 shows a circuit diagram in the photographic lens L.

Contact VBATT on the lens side is connected to each of the motor drive units 63, 64, 65, and power is directly supplied from battery 22 in the camera body CB to each of the motors 60, 61, 62 by switching the drive units, one after another.

Motor drive units 63, 64, 65 are connected to groups of terminals PH, PI, PJ of the lens CPU 66 and are controlled thereby, respectively. Pulsers 68, 69, and 70 are connected to terminals P20–P22, and are used to deliver the drive amounts of the respective motors to the lens CPU 66.

Contact Vdd is used to supply power from the display CPU 11 on the camera body CB side to terminal Vdd of the lens CPU66, and to a reset circuit which comprises a resistor R, a diode D and a capacitor C.

The resistor and the capacitor allow the reset circuit to have a fixed time constant, and the reset circuit thus functions so as to have a program fed to the lens CPU 66 started by a switching terminal $\overline{\text{RESET}}$ of the lens CPU 66, from a low active state (L) to a high state (H) when the power supply voltage is stabilized with the passage a predetermined time after the actuation of Vdd.

Terminals P23–P27 of the lens CPU 66 are connected to a third autofocusing switch SWAF3 for auto-to-manual switching of the autofocusing system provided on the lens side, a zoom changeover switch SWPZ1 for selecting automatically-effected zooming by means of a motor, or manual zooming, a constant magnification switch SWPZ2 for effecting zooming automatically in association with the movement of the lens relative to the object so as to hold a given magnification, a zoom switch SWPZT on the Tele side for use in driving the PZ motor 69 in such a manner as to move the photographic lens L in a direction in which the focal length of the lens is prolonged, and a zoom switch SWPZW on the Wide side for use in driving the PZ motor in such a manner as to move the photographic lens L in a direction in which the focal length thereof is shortened.

The lens CPU 66 is equipped with a terminal INT for receiving an electric signal which is applied to interrupt the program being executed by the CPU, a terminal SCK for receiving a serial clock signal from the display CPU 11 on the camera body CB side, a terminal SI/SO for serially transferring data, and a terminal $\overline{\text{RDY}}$ for synchronizing serial communication of the lens CPU 66 with peripheral equipment.

Terminal INT allows the lens CPU 66 to be interrupted at L→H after $\overline{\text{RESET}}$, whereas terminal $\overline{\text{RDY}}$ makes the display CPU 11 on the camera body CB side remain on standby to prevent it from executing the serial communication at H, and which permits the display to carry on serial communication at L.

Like the groups of terminals PL, PM of the lens ROM 67, a group of terminals PK of the lens CPU 66 are connected to the zoom code plate 71 and the distance code plate 72, and are made to receive focal length data and distance data corresponding to the actual state of the lens.

Lens ROM 67 stores data inherent to the photographic lens L; e.g., fixed data concerning the number at an open aperture. The f-number at a number open aperture, the degree of change of f-number which is accompanied by zooming, and variable data.

Data stored in the lens ROM 67 is under the control of the lens CPU 66, or is transferred via the groups of electric contacts TC to the CPU on the camera body side CB in compliance with a direct request from the CPU on the camera body side CB.

With this arrangement, automatic focusing is effected as follows in a camera system having the aforementioned functions, when the zooming lens group is driven by the zoom switch SWPZT on the tele-side, or the zoom switch SWPZW on the wide-side, while an in-focus state has been established with the first autofocusing switch SWAF1 held ON, the focus priority mode selected by the second autofocusing switch SWAF2, and the power-zooming mode selected by the zoom changeover switch SWPZ1.

The flow charts shown in FIGS. 4-14 will subsequently be described.

Figure 4:
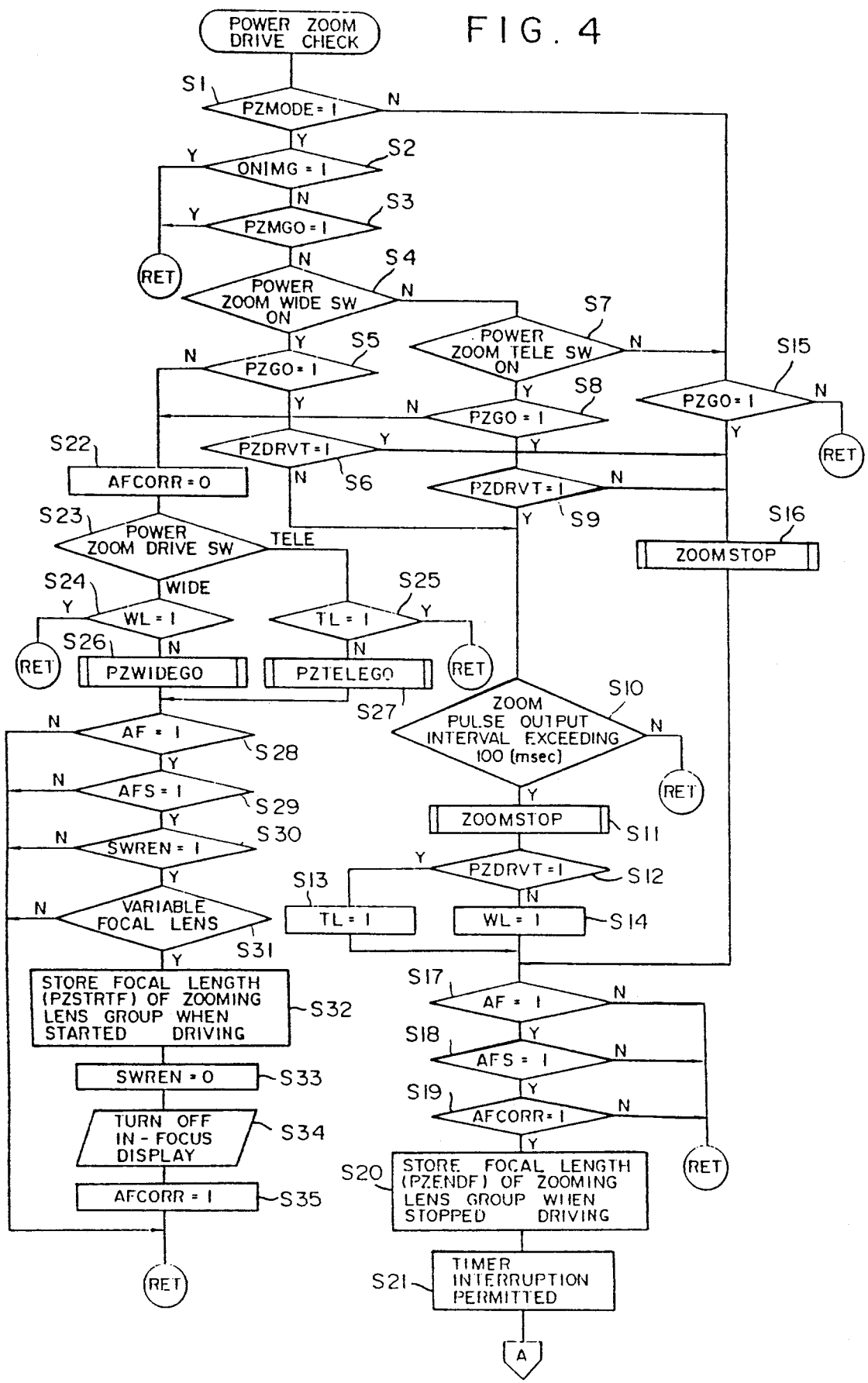
FIG. 4 shows a subroutine for processing a power zoom drive check.

Referring to FIG. 4, a description will first be given of a flow chart concerning a power zoom drive check.

Figure 5:
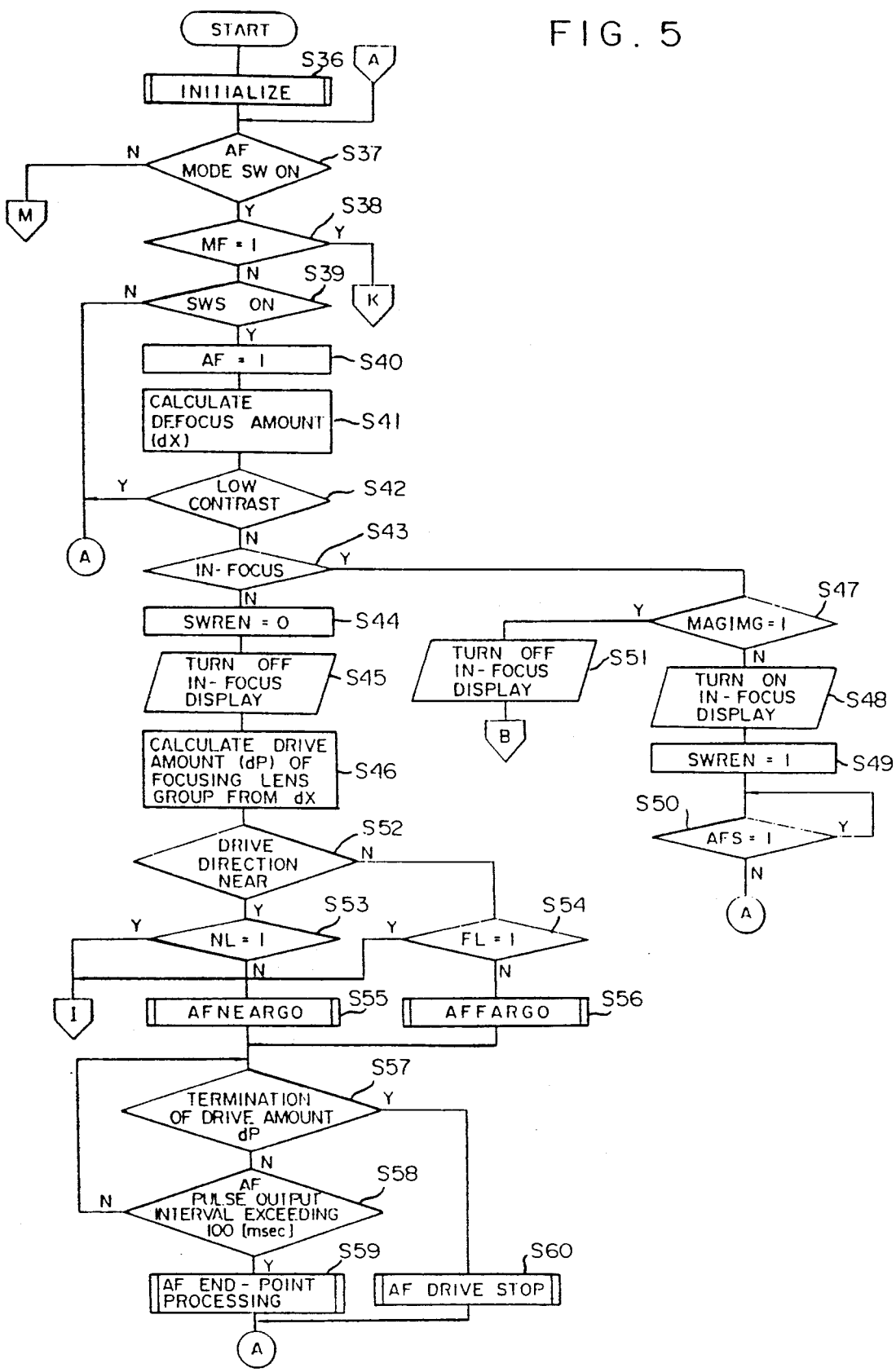
FIG. 5 shows a main flow chart for an automatic focusing system.

The following program is executed in a manner similar to a release process during a timer interruption of the execution of a main autofocusing (AF) processing (FIG. 5), as will be described later, which is started when power is supplied from the DC/DC converter 25 as the photometric switch SWS is turned ON, and while the lock switch SWL is held ON. The flow of the program returns to the AF processing (FIG. 5) to effect automatic focusing after the following power zoom drive check is processed and, then, the release process is performed during the timer interruption. FIG. 5 is similar to FIG. 14 of the [880 application incorporated by reference herein; and routines such as K, M, B and I of FIG. 5 are detailed in other Figures of the '880 drawings.

With respect to the power zoom drive check process, a decision is made as to whether the power zoom mode has been set up in Step 1. If YES, i.e., if the power zoom mode has been set up, a decision is made on whether a constant image magnification control is being exercised, and another decision is made as to on whether an AF power zoom drive in the macro zone is effected in Steps 2 and 3, respectively.

If Steps 2 or 3 are YES, the flow returns, since this flow chart is not intended to show a process in which the program works in this case. If NO, a decision is made on whether the zoom switch SWPZW on the wide side is ON.

When the zoom switch SWPZW on the Wide side is determined to be ON, a decision is made in Step 5 as to whether the zooming lens group is being driven. If YES, a decision is made on whether the drive direction of the zooming lens group is pointed to Tele in Step 6.

On the other hand, if the zoom switch on the Wide side is determined to be OFF in Step 4, decisions similar to those made in Steps 4 through 6 are provided to the zoom switch SWPZT on the Tele side in Steps 7 through 8.

If any one of the power zoom switches has been turned ON and if the zooming lens group is being driven in a direction conforming to the power zoom switch thus turned ON in Steps 4 through 6 and Steps 7 through 9, a decision is made on as to whether the pulse of the PZ pulser 69 is output at intervals exceeding 100 msec in Step 10.

If the output interval is not greater than 100 msec, the flow returns because the zooming lens group is being driven, whereas if it exceeds 100 msec, a zoom stop subroutine (FIG. 9) is executed in Step 11 because the zooming lens group ought to have reached the end point. A decision is then made on as to whether the zooming lens group is being driven in the direction of the tele zoom range end in Step 12. If YES, a flag representing the existence of the zooming lens group at the Tele end is set in Step 13, whereas if NO; a flag representing the existence of the zooming lens group at the Wide end is set in Step 14. Step 17 is then followed.

If NO, i.e., if the power zoom mode has not yet been set up in Step 1, Step 15, like Steps 4 and 7 in which both power zoom switches at the Tele and Wide ends are held OFF, is followed. A decision is then made as to whether the power zoom switch is being actuated in Step 15. If NO, the flow returns, whereas if YES, Step 17 is followed after the zoom stop routine (FIG. 9) is executed in Step 16.

Steps 13, 14, and 16 are followed by Steps 17-19, wherein decisions are made, respectively on whether autofocusing (AF) is being executed, whether the focus priority mode has been set up, and whether AF correction is being executed in order. If the result of the determinations is YES in all of these steps, the focal length (PZENDF) at the time the zooming lens group stops being driven is stored in Step 20, and the interruption of the timer is permitted in Step 21. The AF flow chart shown in FIG. 5 is then followed via A, wherein automatic focusing is again executed as will be described later and corrections required by the power zoom drive are made.

If NO, i.e., if the power zoom drive is not carried on in Steps 5 and 8, a flag representing AF correction caused by the power zoom drive of the zooming lens group is set to 0 in Step 22, and a decision is made as to whether the power zoom drive switch is on the Tele or Wide side in Step 23. In other words, a decision is made on which one of the zoom switches, SWPZT as to the Tele side and SWPZW on the Wide side, has been turned ON in this embodiment.

If the zoom switch on the Wide side has been turned ON, a decision is made as to whether the zooming lens group is located at the Wide end in Step 24, whereas if the zoom switch on the Tele side has been turned ON, a decision is made as to whether it is located at the Tele end in Step 25. If YES, the flow returns. If NO, subroutines (FIGS. 7 and 8) are executed in Steps 26, 27 to drive the zooming lens group up to the end point, respectively.

Steps 26, 27 are followed by Steps 28, 29, wherein decision are made as to whether AF is carried on and whether the focus priority mode has been set up. In Steps 30, 31, decisions are made as to whether the shutter-release is permitted and as to whether the photographic lens is a so-called varifocal lens, which causes the zoom drive to be accompanied with a change of image-forming position in order.

Data on whether the photographic lens is a varifocal lens is read from the discrete data stored in the lens ROM 67, and is used for making such a decision.

If YES in Steps 28-31, the focal length (PZSTRTF) of the zooming lens group at the time it starts to be driven is stored in Step 32. In Steps 33-35, a flag representing the shutter-release permission is set to 0, an in-focus display is turned OFF, and a flag representing AF correction is set to 1, respectively. The flow then returns.

If, on the other hand, Steps 28-31 are ON, the following steps are skipped and the flow returns.

Referring to FIG. 5, a description will subsequently be given of a flowchart connected to A. Since this flowchart is the main flowchart concerning automatic focusing, it will be described from the start.

This program is started when power is supplied from the DC/DC converter 25 as the photometric switch SWS is turned ON, and while the lock switch SWL is held ON.

When the program is started, an initializing subroutine is first executed in Step 36, and Step 37 is followed. The contents of the initializing subroutine will be described in FIG. 6.

In Step 37, a decision is made as to whether an AF mode has been set up after the AF mode switch SWAF3 is turned ON.

If the AF mode has not yet been set up, this flowchart is not executed.

Step 38 is then followed, provided the AF mode has been set up. In the case of a manual mode other than the AF mode, processing can only be achieved in the manual mode, and therefore, automatic focusing is not executed (M of FIG. 5)

In Step 38, a decision is made as to whether manual focusing is being carried out.

If YES, it means the AF mode has been switched to the manual focusing and, this flowchart is not executed as in the case of Step 37. Thus, the flow returns via an NG processing mode to Step 37 and enters the manual mode (K of FIG. 5).

If NO, Step 39 is followed and a decision is made as to whether the photometric switch SWS is held ON. If YES, a flag representing the AF mode is set in Step 40 and an AF operation starts.

If the decision is NO in Step 39, the flow returns to Step 37 because a user's intention to take pictures is not confirmable, and the process/subroutine keeps cycling through Steps 37-39 to wait for the photometric switch SWS to be turned ON.

When the AF operation starts in Step 40, defocus amount dx detected by a detector such as the AF CCD 17 is computed in Step 41, and a decision is made as to whether the contrast of the signal detected in the CCD 17 is low in Step 42.

If YES, the flow returns to Step 37 because automatic focusing is hardly attainable with the present output of the CCD 17, and the routine keeps cycling through Steps 37-42 to wait for the contrast to be recovered or the manual mode to be selected.

If NO, a decision is made as to whether an in-focus state exists in Step 43.

If that state as it stands is not the in-focus state, the decision becomes NO and Steps 44-46 are followed. In Steps 44-46, a flag representing the inhibition of the actuation of the release switch SWR is set; the in-focus display is turned OFF; and the drive amount dP of the focusing lens group is computed from the defocus amount dx.

If the state as it stands is judged to be an in-focus state in Step 43, Steps 47-51 are followed and a decision is made as to whether a constant image magnification is being controlled in Step 47. If NO, the in-focus display is turned ON and a flag representing the permission of the actuation of the release switch SWR is set, so that Step 50 is followed. Consequently, shutter-release during timer interruption becomes possible after Step 49.

If on the other hand, in Step 47, the answer is YES, the in-focus display is turned OFF in Step 51, and a constant image magnification control mode is followed at (B).

In Step 50, a decision is made as to whether the focus priority mode has been set up. If YES with the flow being cycled, the focus low is implemented, whereas if the decision is NO, the flow returns to Step 37.

When the drive amount dP of the focusing lens group is computed with the NO decision in Step 43, as set forth above, the drive direction of the focusing lens group is determined according to a signal given by the aforementioned detector in the following step 52. A decision is then made as to whether the focusing lens group is located at the Near end in Step 53. when that drive direction is pointed to the Near side, whereas a decision is made as to whether the focusing lens group is located at the Far end in Step 54, when the drive direction is pointed to the Far side.

Figure 14:
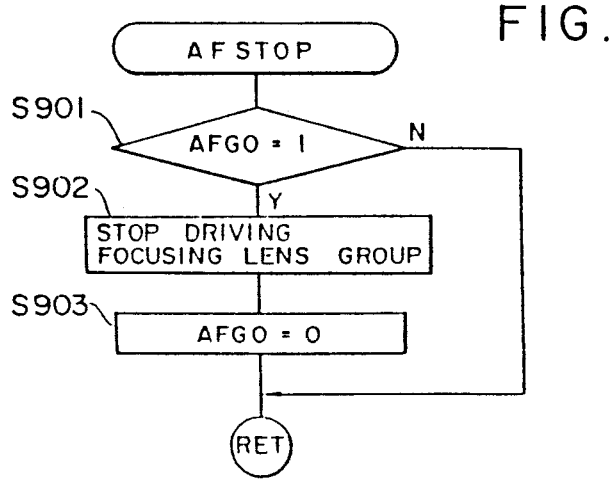
FIG. 14 shows an AF stop subroutine.

If YES in Steps 53, 54, AF processing in the macro zone is started according to I, as in FIG. 14 of the above-mentioned U.S. application Ser. No. 07/410,880.

If NO in Steps 53, 54, a subroutine (FIGS. 10, 11) for moving the focusing lens group to the end point in the drive direction side is executed in Step 55 and or 56. Irrespective of Step 55, 56, Step 57 is followed.

In Step 57, a decision is made as to whether the focusing lens group has completely been driven to the extent of the drive amount dP. If NO, a decision is made as to whether the pulse of the AF pulser 68 is outputted at intervals exceeding 100 msec in Step 58. If the output interval exceeds 100 msec, an AF end-point processing subroutine (FIG. 12) is executed in Step 59 and the flow returns to Step 37.

If the output interval is not greater than 100 msec, the flow returns to Step 57 and keeps cycling through Steps 57, 58 to wait for the completion of the drive amount dP, or for the AF pulser 68 to be output at intervals of 100 msec.

If YES in Step 57, i.e. upon termination of the driving of the focusing lens group by the drive amount dP, Step 60 is followed and, after an AF drive stop subroutine (as will be described in FIG. 13) is executed, the flow returns to Step 37. The shutter-release becomes possible provided the in-focus state is established in Steps 37-43 and Step 47-57, whereas the flow cycles through Steps 37-46 and Step 52-62 are followed if the in-focus state is not established.

As set forth above, the AF process shown in FIG. 5 is followed by the power zoom drive check shown in FIG. 4 by means of the timer interruption. Further, the power zoom drive check is followed by the aforementioned AF process again and, after the in-focus state is established through the AF process, shutter-release is carried out by means of the timer interruption. Even when the zooming lens group is driven with power zooming after the in-focus state is reached through the AF process, the zooming lens group can be focused and therefore an out of focus picture will be prevented from being taken.

Referring now to FIGS. 6-14, the subroutines shown in FIGS. 4 and 5 will subsequently be described.

Figure 6:
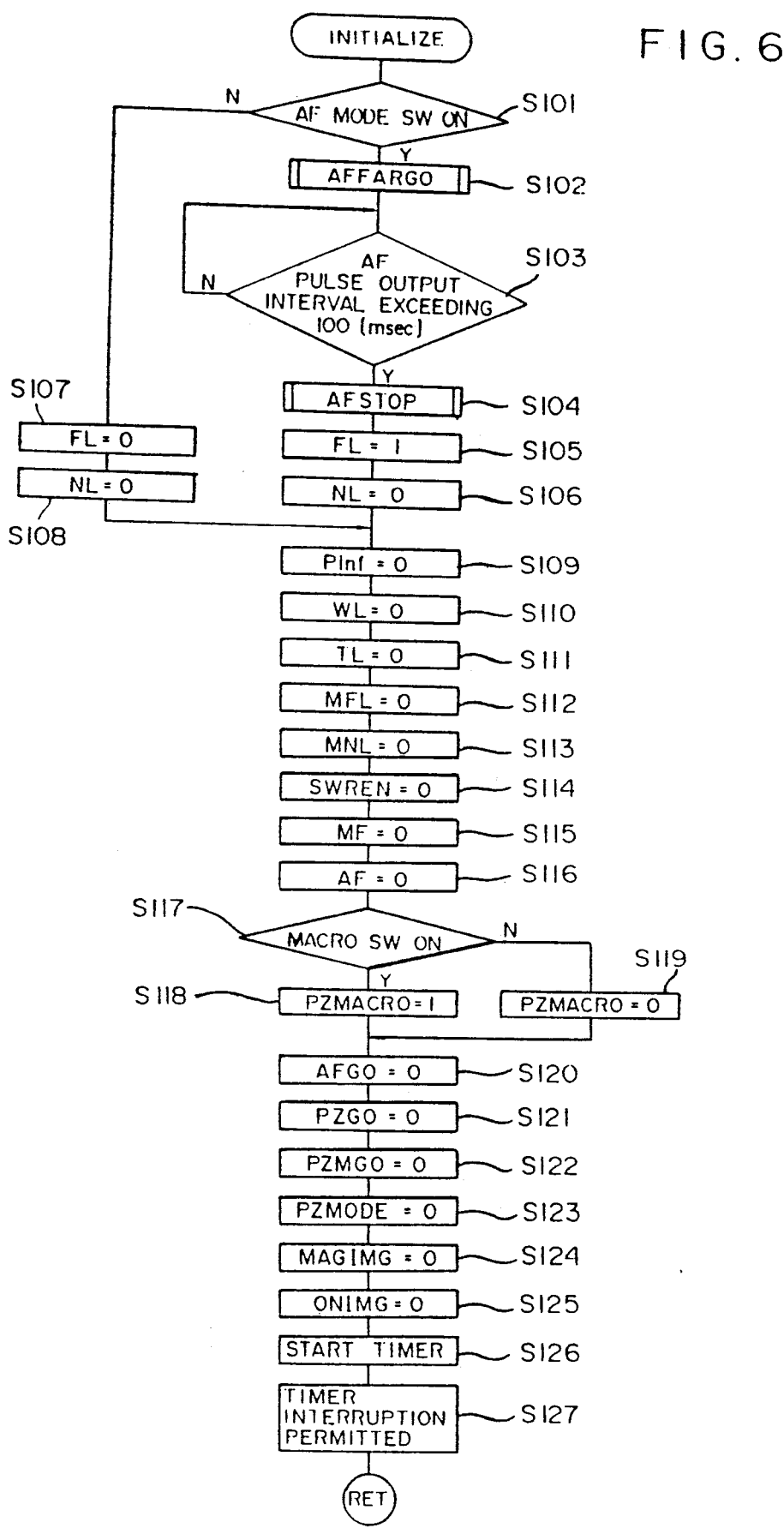
FIG. 6 shows an initializing subroutine.

Referring to FIG. 6, the initializing subroutine will be described.

Figure 11:
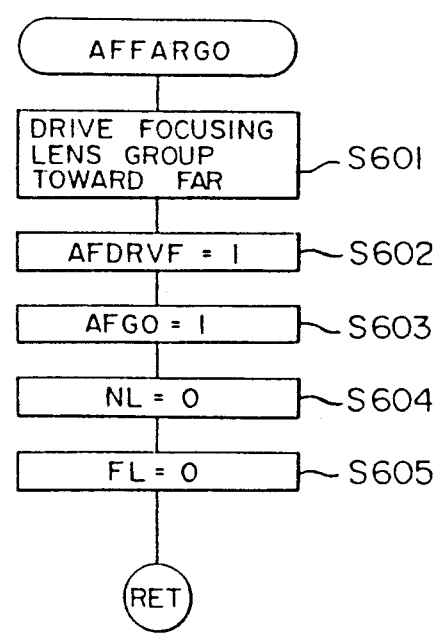
FIG. 11 shows a subroutine for driving the focusing lens group in the direction of a Far end of a zooming range.

When the initializing subroutine is initiated, a decision is first made as to whether the AF mode switch is held ON in Step 101. When the switch is turned ON to set up the AF mode, the subroutine for driving the focusing lens group up to the Far end is executed in Step 102 (FIG. 11).

In Step 103, a decision is made as to whether the AF pulse is outputted at intervals exceeding 100 msec.

This is because the output interval exceeding 100 msec is considered indicative of the fact that the focusing lens group is located at the Far end.

If the output interval exceeds 100 msec, an AF stop subroutine (FIG. 14) is executed in Step 104. A flag representing the existence of the focusing lens group at the Far end, and another representing the nonexistence thereof at the Near end, are set in Steps 105, 106. Step 109 is then followed.

When on the other hand, the manual mode is judged to be in effect in Step 101, flags representing the nonexistence of the focusing lens group at the Far and Near ends are set in Steps 107, 108 respectively. Step 109 is then followed.

In Step 109, the number of pulses Pinf corresponding to the distance of the focusing lens group from the Far end is set to 0. In Steps 110, 111, flags are set; one representing that the zooming lens group is unlocated at the Wide end and the other representing that the lens group is unlocated at the Tele end.

In Steps 112, 113, flags representing the nonexistence of the focusing lens group at the Far and Near ends in the macro zone, because of the annular zoom drive, are set.

In Steps 114–116, flags representing a release inhibition, non-fulfillment of manual focusing, and autofocusing are set.

In Step 117, a decision is made as to the ON/OFF state of the macroswitch.

If the macroswitch is turned ON a flag to that effect is set in Step 118, whereas if it is turned OFF, a flag to that effect is set in Step 119.

In Steps 120–122, following Steps 118 or 119, flags representing the focusing lens group and the zooming lens group remaining undriven, and the zooming lens remaining undriven on an AF basis in the macro zone, are set.

In Steps 123–125, flags representing the possibility of the power zoom drive, commencement of constant control over the image magnification, and image magnification under constant control are set to 0, whereby a 5 msec timer is started in Step 126, and allowed to be interrupted in Step 127. The flow then returns.

Figure 7:
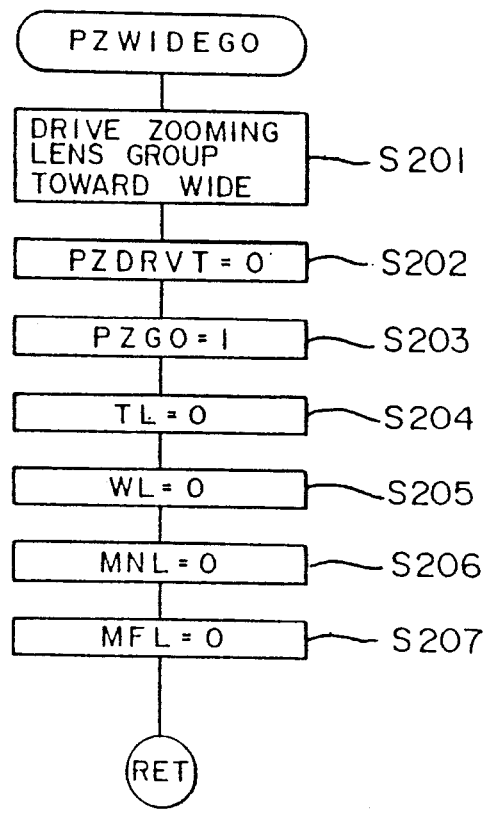
FIG. 7 shows a subroutine for driving a focusing lens group in the direction of a wide end of a macro zone.

Referring to FIG. 7, the subroutine for driving the zooming lens group in the Wide direction will subsequently be described.

When the subroutine is initiated, the zooming lens group starts being driven in the Wide directions in Step 201. Since the zooming lens group is being driven in the Wide direction, in Step 202, a flag representing the zooming lens group being driven in the Tele direction is set to 0, and a flag representing the zooming lens group being driven is set in Step 203.

In Steps 204, 205, flags representing the nonlocation of the zooming lens group at the Tele and Wide ends are set.

In Steps 206, 207, flags representing the nonlocation of the zooming lens group at the Near and Far ends in the macro zone are set. The flow then returns.

Figure 8:
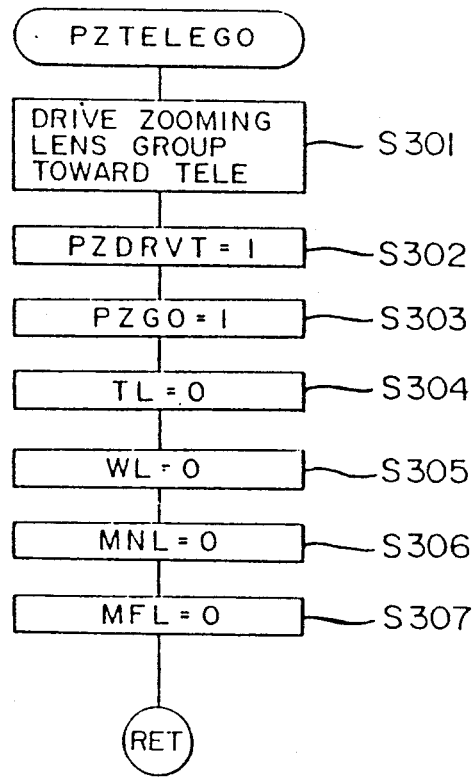
FIG. 8 shows a subroutine for driving a zooming lens group in the direction of a Tele end of a macro zone.

Referring to FIG. 8, the subroutine for driving the zooming lens group in the Tele direction will be described.

When this subroutine is initiated, the zooming lens group starts being driven in the Tele direction in Step 301. In Step 302, a flag representing the zooming lens group being driven in the Far direction is set to 1, whereas a flat representing the zooming lens group being driven is set to 1 in Step 303.

In Steps 304 and 305, flags representing the nonlocation of the zooming lens group at the Tele and Wide ends are set.

In Steps 306, 307, flags representing the nonlocation of the zooming lens group at the Near and Far ends in the macro zone are set.

Figure 9:
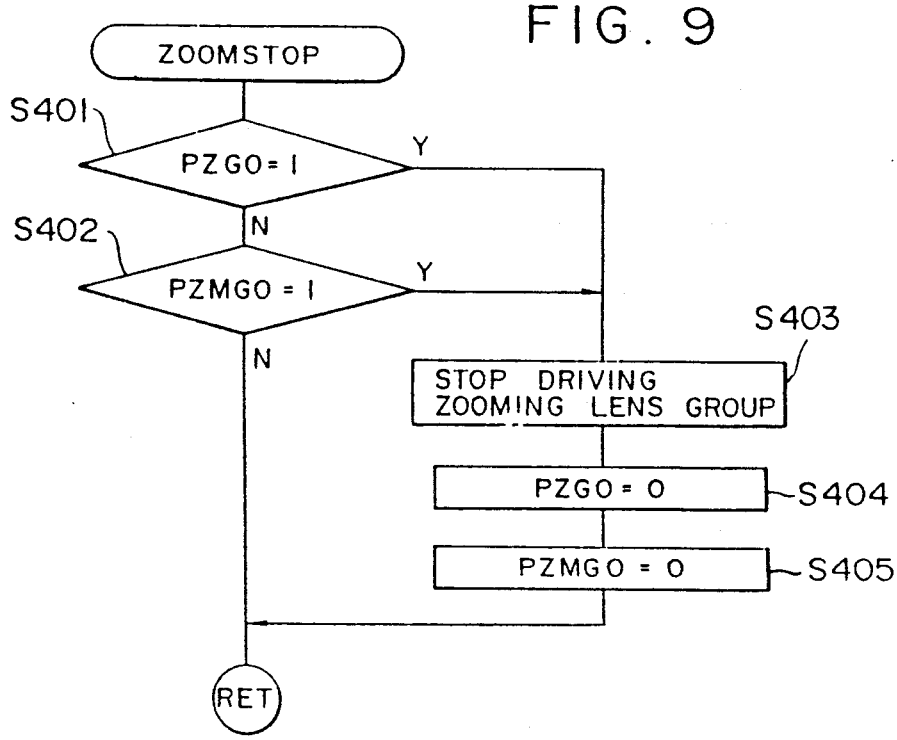
FIG. 9 shows a subroutine for stopping the driving of the zooming lens group.

Referring to FIG. 9, the contents of the subroutine for suspending the driving of the zooming lens group will be described.

With respect to the subroutine for suspending the zooming operation, a decision is made as to whether the zooming lens group is being driven in the zooming or macro zone in Steps 401, 402. If the zooming lens group is being driven in neither zone, the flow as it stands is then returned.

When the zooming lens group is being driven in either zone, the zooming lens group stops being driven in Step 403, and flags representing the zooming lens group being stopped in Steps 404, 405 are set. The flow then returns.

Figure 10:
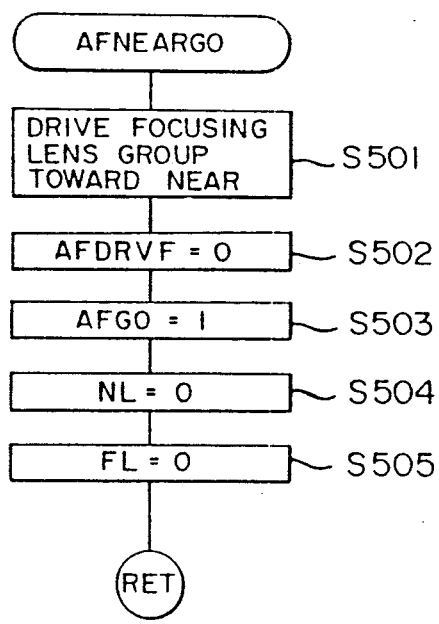
FIG. 10 shows a subroutine for driving the focusing lens group in the direction of a Near end of a zooming range.

Referring to FIG. 10, the contents of a subroutine for driving the focusing lens group in the direction of the Near end will be described.

When the subroutine for driving the focusing lens group in the direction of Near end is initiated, the focusing lens group starts being driven in the direction of the Near end in Step 501. Since the focusing lens group is being driven in the Near direction in Step 502, a flag representing the focusing lens group being driven in the Far direction is set to 0, and a flag representing the focusing lens group being driven is set in Step 503.

In Steps 504, 505, flags, representing the nonexistence of the focusing lens group at the Near and Far ends are set and the flow is returned.

Referring to FIG. 11, the contents of a subroutine for driving the focusing lens group in the direction of the Far end will now be described.

When the subroutine for driving the focusing lens group in the direction of the Far end is initiated, the focusing lens group starts being driven in the direction of the Far end in Step 601. Since the focusing lens group is being driven in the Far direction in Step 602, a flag representing the focusing lens group being driven in the Far direction is set to 1, and a flat representing the focusing lens group being driven is set in Step 603.

In Steps 604, 605, flags representing the nonexistence of the focusing lens group at the Near and Far ends are set and the flow returned.

Figure 12:
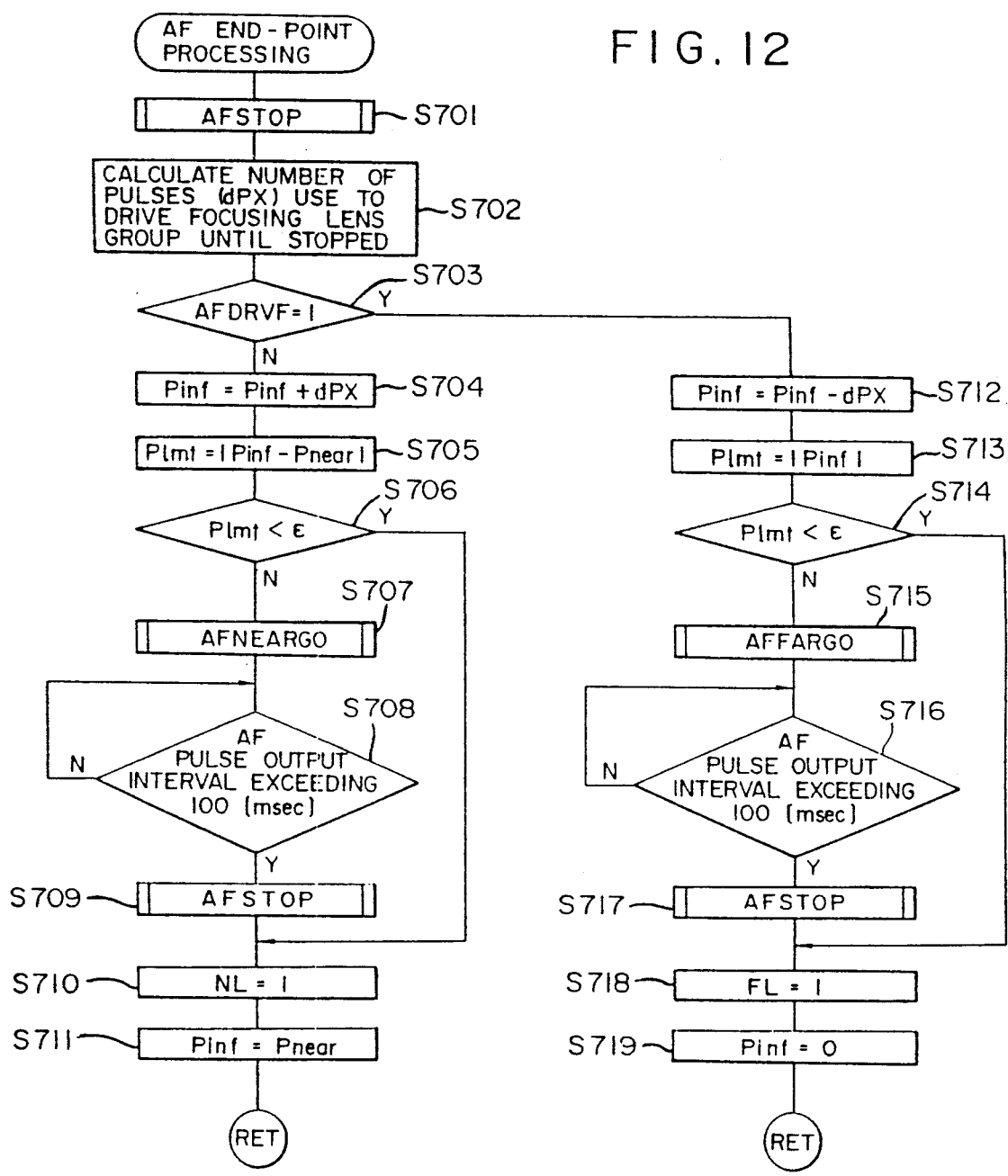
FIG. 12 shows an AF end-point processing subroutine.

The contents of the AF end-point processing subroutine, shown in FIG. 12, will now be described.

When the AF end-point processing subroutine is initiated, the AF stop subroutine (FIG. 14) is executed in Step 701 and the number of pulses dPX used to drive the focusing lens group until it stops is computed in Step 702.

A decision is then made as to whether the focusing lens group has been driven in the direction of the Far end of the zoom in Step 703. If NO, the dPX value calculated in Step 702 is added to the number of pulses Pinf corresponding to the delivered amount of the focusing lens group from the Far end in order to set up Pinf in Step 704. The absolute value of the difference between Pinf and Pnear (the number of pulses from Far to Near end) is defined as Pint (the number of pulses up to the Near end) in Step 705. Step 706 is then followed.

A decision is then made as to whether Pint is smaller than $\epsilon$ (the number of allowable error pulses; e.g. $\epsilon = 10$) in Step 706. If NO, the subroutine (FIG. 10) for driving the focusing lens group in the direction of the Near end is executed in Step 707, and a decision is made as to whether the AF pulse is output at intervals exceeding 100 msec in Step 708.

If the output interval exceeds 100 msec, the AF stop subroutine (FIG. 14) of the focusing lens group is executed in Step 709. If the output interval is not greater than 100 msec, Step 708 is repeated to wait for the end point to be detected and Step 710 is followed.

If on the other hand, Step 706 is YES, Steps 707–709 are skipped and Step 710 is followed because the errors are within a predetermined range.

A flag representing the existence of the focusing lens group at the Near end is set in Step 710 and Pinf is rewritten to Pnear so as to eliminate the accumulation of errors in Step 711. The flow is then returned.

If, on the other hand, Step 703 is YES, the dPX value calculated in Step 702 is subtracted from the number of pulses Pinf corresponding to the delivered amount of focusing lens group from the Far end to set up Pinf in Step 712 and the absolute value of Pinf defined as Pint (the number of pulses up to the Near end). Step 714 is then followed.

In Step 714, like Step 706, a decision is made as to whether Pint is smaller than ε (the number of allowable error pulses; e.g. ε=10). If NO, the subroutine (FIG. 11) for driving the focusing lens group in the direction of the Far end is executed in Step 715 and Step 716 is followed.

In Step 716, a decision is made as to whether the AF pulse is output at intervals exceeding 100 msec. If the output interval exceeds 100 msec, the AF stop subroutine (FIG. 14) of the focusing lens group is executed in Step 717. If the output interval is not greater than 100 msec, Step 716 is repeated to wait for the end point to be detected and Step 717 is followed.

If, on the other hand, Step 714 is YES, Steps 715-717 are skipped and Step 718 is followed between the errors are within a predetermined range.

In Step 718, a flag representing the existence of the focusing lens group at the Far end is set and the starting point is modified with 0=Pinf in Step 719. The flow is then returned.

Figure 13:
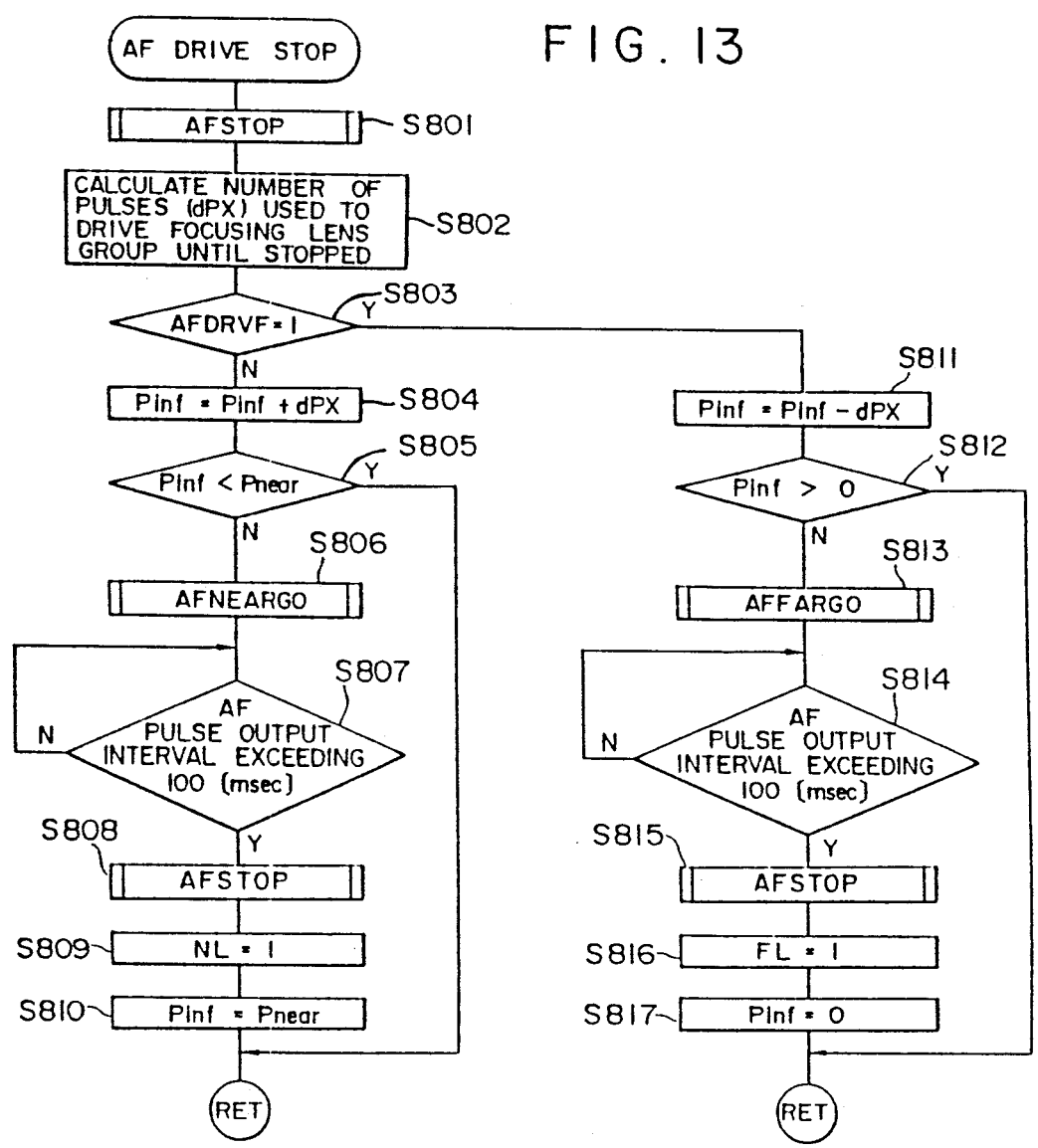
FIG. 13 shows an AF drive stop subroutine.

Referring to FIG. 13, the contents of the AF drive stop subroutine will now be described.

When the AF drive stop subroutine is initiated, the AF stop subroutine (FIG. 14) is executed in Step 801 and the number of dPX pulses used to drive the focusing lens group until it stops is computed in Step 802. Step 803 is then followed.

In Step 803, a decision is made as to whether the focusing lens group has been driven in the direction of the Far end. In NO, the dPX value calculated in Step 802 is added to the number of pulses Pinf corresponding to the delivered amount of the focusing lens group from the Far end to set up Pinf in Step 804. Step 805 is then followed.

In Step 805, a decision is made as to whether Pinf is smaller than Pnear (the number of pulses from the Far end to the Near end). If YES, the flow is returned, whereas if NO, the subroutine (FIG. 10) for driving the focusing lens group in the direction of the Near end is executed in Step 806. Step 807 is then followed.

In Step 807, a decision is made as to whether the AF pulse is output at intervals exceeding 100 msec, and therefore, whether the end point the end point has been reached. If the output interval exceeds 100 msec, the AF stop subroutine (FIG. 14) is executed in Step 808, and Step 809 is followed. If it is not greater than 100 msec, Step 807 is repeated.

In Step 809, a flag representing the existence of the focusing lens group at the Near end is set and Pinf is rewritten to Pnear in Step 811. The flow is then returned.

If on the other hand, Step 813 is YES, the dPX value calculated in Step 802 is subtracted from the number of pulses Pinf corresponding to the delivered amount of the focusing lens group from the Far end in order to set up Pinf in Step 811; and a decision is then made as to whether Pinf is positive or negative in Step 812.

If YES, the flow returns. If NO, the subroutine (FIG. 11) for driving the focusing lens group in the direction of Far end is executed in Step 813 and Step 814 is followed.

In Step 814, like Step 807, a decision is made as to whether the AF pulse is output at intervals exceeding 100 msec.

If the output interval exceeds 100 msec, Step 815 is followed, wherein the AF stop subroutine (FIG. 14) is executed, and Step 816 is followed. If it is not greater than 100 msec, Step 814 is repeated.

In Step 816, a flag representing the existence of the focusing lens group at the Far end is set to 1 and Pinf is 0 in Step 817. Thereafter, the flow is returned.

Referring to FIG. 14, the AF stop subroutine will now be described.

When the AF stop subroutine is initiated, a decision is made as to whether the focusing lens group is being driven on an AF basis in Step 901. If YES, Step 902 is followed, whereas if NO, the flow returns.

In Step 902, the focusing lens group stops being driven and a flag representing the focusing lens group being stopped is set in Step 903. The flow is then returned.

As set forth above, autofocusing is implemented to create the in-focus state again, even though zooming is performed in the focus-lock state thereafter to ensure that an out-of-focus picture is prevented from being taken and to increase, the freedom of using a zoom lens when the zoom lens is employed to determine a composition in the finder.

Figure 15:
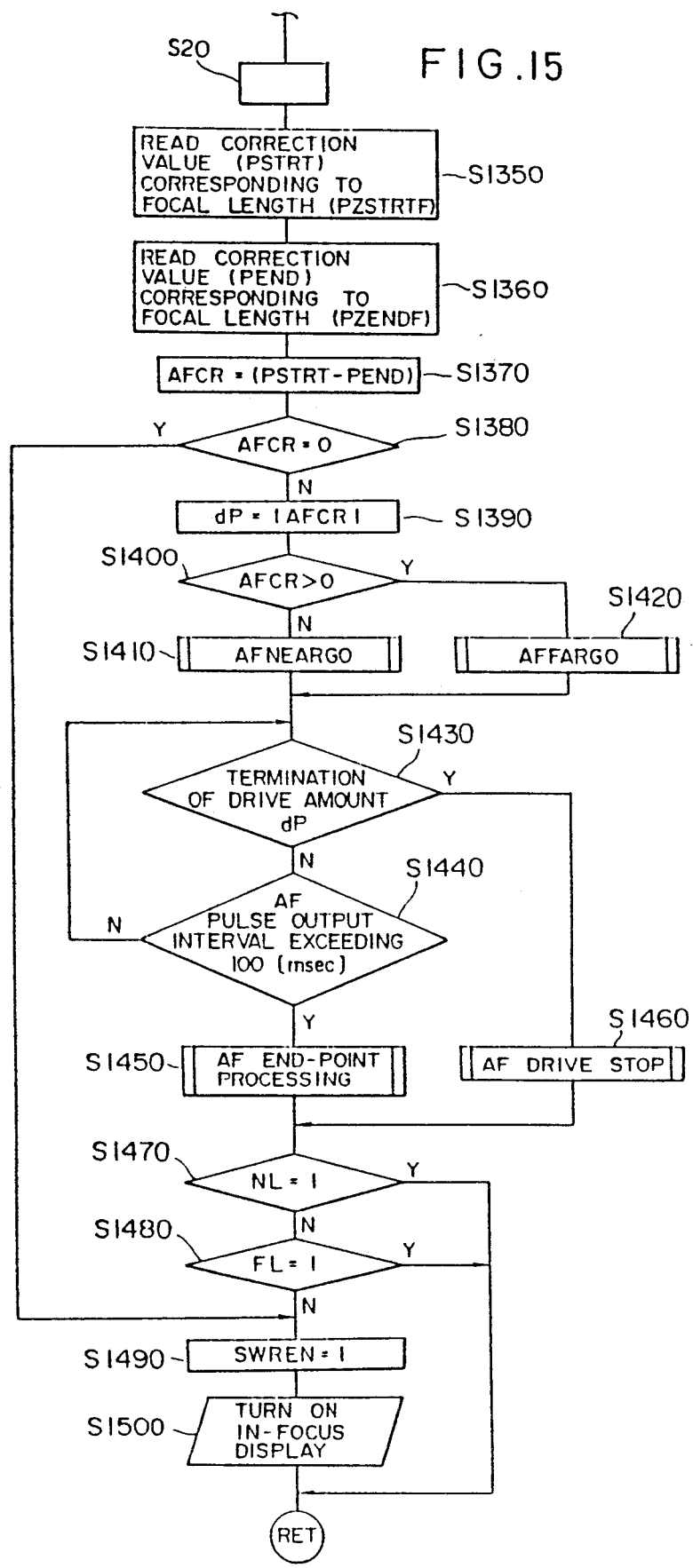
FIG. 15 shows a modified subroutine of FIG. 4.

FIG. 15 shows another embodiment of the present invention, wherein the power zoom drive check processing is modified from that illustrated in FIG. 4.

In the flow of FIG. 4, if the decision results of Step 17 through 19 are all YES, the flow goes to Step 37 of FIG. 5 via Step 20 and 21 for again detecting the defocus amount. In the modified embodiment shown in FIG. 16, however, if the results of decisions in Step 17 through 19 are all YES, the flow goes to Step 1350 via Step 20.

In this modified embodiment, it should be noted that correction data in the form of values inherent in the photographic lens is stored in the lens ROM 67 as follows:

The correction data expresses a deviation from the expected focus by the number of pulses indicative of the movement of the focusing lens group when the zooming lens group of the photographic lens L is driven to set a focal length; e.g., the number of pulses becomes what is shown in Table 1, assuming that the photographic lens L is a varifocal lens having a focal length of 70-210 mm.

TABLE 1

| Focal length: | Correction Data Correcting number of pulses |
|---|---|
| 70 | n1 |
| 79 | n2 |
| 89 | n3 |
| 101 | n4 |
| 114 | n5 |
| 129 | n6 |
| 146 | n7 |
| 165 | n8 |
| 188 | n9 |
| 210 | n10 |

The corrected number of pulses varies with the design of the lens and the method of setting any one of n1-n10 at 0 as a standard.

The data stored in the lens ROM 67 is under the control of the lens CPU 66, or is transferred via the group of electric contacts TC to the CPU on the camera body side CB in compliance with the direct request from the CPU on the camera body side CB.

Turning to the flow of FIG. 15, in 1350, a correction value (PSRTR) corresponding to the focal length (PZSTRTF) of the zooming lens group stored in Step 32 at the time it is started is read from the lens ROM 67 on the condition that the AF operation is being carried out, that the focus priority mode has been set up and that the AF is being corrected in Steps 17-19.

This is intended to compute the deviated amount of the focusing lens group as the zooming lens group is driven in the following steps.

In Step 1360, a correction value (PEND) corresponding to the focal length (PZENDF) stored Step 20 at the time it is stopped is read therefrom and (PSTRT—PEND) is computed to give a focusing correction amount (AFCR) in Step 1370.

In Step 1380, a decision is made as to whether the focusing correction amount (AFCR) is 0. If NO, the absolute value of AFCR is made to the drive amount dP in Step 1390.

In Step 1400, a decision is made as to whether AFCR is positive. If NO, a subroutine (FIG. 10) for driving the focusing lens group in the direction of Near end is executed in Step 1410, whereas if YES, the subroutine shown in FIG. 11 for driving the focusing lens group in the direction of the Far end is executed in Step 1420.

In Step 1430, a decision is made as to whether the driving by dP has terminated. If NO, a decision is made as to whether the pulse of the AF pulser 68 is output at intervals exceeding 100 msec and whether the focusing lens group has reached the end point in Step 1440. If YES, an AF end-point processing subroutine (FIG. 12) is executed in Step 1450 and Step 1470 is followed. If NO, the flow returns to Step 1430 and keeps cycling through Step 1430, 1440 to wait for the driving by dP to be terminated or for the end point to be detected.

If the decision is YES in Step 1430 on the assumption that the drive quantity of dP has been terminated, an AF drive stop subroutine (FIG. 13) is executed in Step 1460 and Step 1470 is followed.

In Steps 1470, 1480 following Steps 1450, 1460, a decision is made as to whether the focusing lens group is located at the Near or Far end. When the focusing lens group is absent at any one of the Near and Far group is present at one of the Near and Far end, the following steps are skipped and the flow returns.

When it is judged that AFCR=0 in Step 1380, Steps 1390-1480 are skipped and Step 1490 is followed.

In Step 1490 following Steps 1480, 1380, a flag representing the permission for shutter release is set in Step 1490, and the LCD 12 for displaying the in-focus display is turned ON in Step 1500. The flow then returns.

As is obvious from the above description, if a power zoom is driven after the in-focus state is established in Step 43, a correction value corresponding to the focal length of the zooming lens group is stored in Steps 20, 32 where the power zoom drive check is effected by means of the timer interruption is read from the lens ROM 67 so as to correct the drive amount of the focusing lens group according to the results computed in Steps 1410, 1420. When the drive amount is thus corrected, the permission of releasing and the in-focus display are made in Steps in 1490, 1500, respectively.

As a result, an out-of-focus picture is prevented from being taken.

In accordance with the above embodiment, automatic focusing is implemented to establish the in-focus state again, even through zooming is performed in the focus-lock state thereafter so as to ensure that an out-of-focus picture is prevented from being taken and to increase the freedom of using a zoom lens when the zoom lens is employed to determine a composition in the finder because the amount of a focus defect corresponding to the movement of the zooming lens group is read from the storage means in order for the driving of the focusing lens group to be corrected according to the amount of the defect thereof.

For the meaning of all terms and acronyms used in this specification but not fully described herein, reference is specifically made to the '880 application expressly incorporated by reference herein (for, e.g., SWREN, which is described at page 41 of the '880 application; and for major terms used in the flowcharts herein which are described at pages 40-45 of such application).

What is claimed is:

1. An autofocusing system for a camera having a photographic lens including a focusing lens group and a zooming lens group, said system comprising:
   means for driving said focusing lens group to obtain an in-focus condition of an object to be photographed;
   means for driving said zooming lens group for zooming said photographic lens;
   focus lock means for disabling said focus-drive means once said photographic lens is brought into said in-focus condition; and
   re-focus means for re-enabling said focus drive means to drive said focus lens group so as to ensure that said photographic lens is in said in-focus condition when said zooming lens group is driven by said zoom drive means after said focus drive means is disabled by said focus lock means.

2. The focusing system according to claim 1, further comprising means for detecting defocusing information by using light passing through said photographic lens, said focus drive means driving said focusing lens group based upon said detected defocus information wherein defocus information detection is again executed by said defocus information detecting means when said focus drive means is enabled by said re-focus means.

3. The autofocusing system according to claim 2, wherein said defocus information comprises both an amount and a direction of defocusing of said photographic lens with respect to an ideal focal plane.

4. An autofocusing system for a camera having a photographic lens including a focusing lens group and a zooming lens group, said system comprising:
   means for driving said focusing lens group to obtain an in-focus condition of an object to be photographed;
   means for driving said zooming lens group for zooming said photographic lens;
   focus lock means for disabling said focus drive means once said photographic lens is brought into in-focus condition;
   memory means for storing data pertaining to a relationship between a focal length of said photographic lens and a focus correction amount corresponding to said focal length of said photographic lens; and focus correcting means for re-enabling said focus drive means so as to drive said focusing lens group in response to data stored in said memory means so as to ensure that said photographic lens is in said in-focus condition when said zooming lens group is driven by said zoom drive means after said focus drive means is disabled by said focus lock means.

5. The autofocusing system according to claim 4, wherein said focus drive means comprises a pulse motor and wherein said focus correction amount comprises the number of pulses by which said pulse motor is operated.

6. The autofocusing system according to claim 4, wherein said camera comprises a camera body and a lens unit that is interchangeably mounted to said camera body and said memory means comprises a read-only-memory installed in said lens unit for storing data inherent to said lens unit.

7. The autofocusing system according to claim 1 wherein said zoom drive means comprises a motor.

8. The autofocusing system of claim 4, wherein said zoom drive means comprises a motor.

9. The autofocusing system of claim 4, wherein said zoom drive means comprises a motor and said memory means comprises a read-only-memory.

10. A method for performing an autofocusing operation with a camera employing a photographic lens having a focusing lens group and a zooming lens group, comprising the steps of:

driving the focusing lens group to obtain an in-focus condition of an object to be photographed;

disabling the driving of the focusing lens group once the in-focus condition is obtained;

diving the zooming lens group if it is desired to change an image magnification value of the object to be photographed; and re-enabling the driving of the focusing lens group to drive the focusing lens group so as to ensure that the photographic lens is in the in-focus condition if the zooming lens group has been driven after the driving of the focusing lens group was disabled.

11. The method of claim 10, further comprising the step of detecting defocus information based upon light that bounces off the object to be photographed and which then passes through the photographic lens, the defocus information being used to control the driving of the focusing lens group.

12. The method of claim 11, further comprising the step of re-detecting defocus information when the driving of the focusing lens group is re-enabled.

13. The method of claim 11, wherein the step of obtaining defocus information involves obtaining both an amount of defocus of the photographic lens and a direction of defocus of the photographic lens.

14. The method of claim 12, wherein the step of obtaining defocus information involves obtaining both an amount of defocus of the photographic lens and a direction of defocus of the photographic lens.

15. The method of claim 10, wherein the step of re-enabling the driving of the focusing lens group is performed to correct for focusing inaccuracies that occur when the photographic lens is zoomed.

16. An autofocusing system for a camera employing a photographic lens having a focusing lens group and a zooming lens group, comprising:

means for shifting said focusing lens group so as to obtain an in-focus condition of an object to be photographed;

means for disabling said focusing lens group shifting means when said in-focus condition is obtained;

means for determining whether said zooming lens group is shifted, so as to change a magnification value of said photographic lens, after said focusing lens group shifting means has been disabled by said disabling means; and means for reactivating said focusing lens group shifting means to reshift said focusing lens group to said in-focus condition if said determining means determines that said zooming lens group has been shifted after said focusing lens group shifting means was disabled.

17. The system of claim 16, wherein said focusing lens shifting means comprises a motor.

18. The system of claim 16, wherein said shifting of said focusing lens group is performed under the control of a central processor unit.

19. The system of claim 18, further comprising means for determining an amount of defocus, said defocus amount being used to drive said focusing lens group to said in-focus condition.

20. The system of claim 16, further comprising means for inhibiting the operation of a shutter until after said focusing lens group has been reshifted if said zooming lens group has been shifted after said focusing lens group shifting means has been disabled.

21. A method for performing an autofocusing operation with a zoom camera employing a photographic lens having a focusing lens group and a zooming lens group, comprising the steps of:

moving the focusing lens group so as to focus the camera upon an object to be photographed to obtain an in-focus condition;

disabling the moving of the focusing lens group once the in-focus condition is obtained;

storing data relating to a relationship between a focal length of the photographic lens and a focus correction amount corresponding to the focal length of the photographic lens;

moving the zooming lens group if it is desired to change an image magnification value of the photographic lens; and re-enabling the moving of the focusing lens group so as to perform a focusing correction operation of the photographic lens so as to re-obtain the in-focus condition, based upon the stored data pertaining to the setting of the focal length of the photographic lens, if the zooming lens group is moved after the moving of the focusing lens group has been disabled.

22. The method of claim 21, wherein the step of moving the focusing lens group comprises employing a motor to shift the focusing lens group to obtain the in-focus condition.

23. The method of claim 21, wherein the step of moving the focusing lens group comprises employing a pulse motor, the step of performing the focus correction operation being dependent upon the number of pulses produced by the pulse motor.

24. The method of claim 21, wherein the step of storing data comprises placing data relating to the photographic lens in a memory that is associated with the photographic lens.

25. The method of claim 24, further comprising the step of locating the memory inside the photographic lens.

26. The method of claim 24, wherein the memory comprises a read-only-memory.

27. The method of claim 21, wherein the step of moving the zooming lens group comprises employing a motor to shift the zooming lens group to a new focal length.

28. The method of claim 21, further comprising the step of obtaining a defocus value which is used for moving the focusing lens group to obtain the in-focus condition.

29. The method of claim 28, wherein the step of obtaining the defocus value comprises obtaining an amount of defocus of the photographic lens and a direction of defocus of the photographic lens.

30. The method of claim 29, wherein the step of obtaining the defocus value comprises passing light reflected by the object to be photographed through the photographic lens so that it falls upon a light sensor located in the camera.

31. An autofocusing system for a zoom camera, comprising:
a photographic lens that is selectively coupled to said zoom camera, comprising:
a shiftable focusing lens group;
a shiftable zooming lens group;
means for shifting said focusing lens group;
means for shifting said zooming lens group; and
means for storing data pertaining to focusing characteristics of said photographic lens for different focal length settings; and
a camera body, comprising:
means for selectively coupling said photographic lens to said camera body;
means for obtaining a defocus value based upon light reflected by an object to be photographed and which then passes through said photographic lens that is selectively coupled to said camera body;
means for performing a series of instructions based using said obtained defocus value for operating said focus lens group shifting means to shift said focus lens group until an in-focus condition is obtained;
means for disabling said focus lens group shifting means when said in-focus condition is obtained; and
means for instructing said instruction performing means to operated said zooming leans group shifting means to shift said zooming lens group, said instruction performing means re-enabling said focusing lens group shifting means so as to executed a focusing correction operation based upon said data stored in said memory means in order to re-obtain said in-focus condition if said instruction performing means is instructed to perform said focusing correction operation when said zooming lens group shifting means operates after said focus lens group shifting means was disabled.

32. The system of claim 31, wherein said focusing lens group shifting means comprises a motor.

33. The system of claim 31, wherein said focusing lens group shifting means comprises a pulse motor that produces a series of pulses as it is operated and said zooming lens group shifting means comprises a motor.

34. The system of claim 33, wherein said instruction performing means counts said pulses produced by said pulse motor as said focusing lens group is shifted, said pulse count being used in said focusing correction operation to correct for any focusing error that may occur when said zooming lens group is shifted.

35. The system of claim 31, wherein said data storing means comprises a memory.

36. The system of claim 35, wherein said memory comprises a read-only-memory.

37. The system of claim 31, wherein said defocus value obtaining means provides an amount and direction of defocus of said photographic lens with respect to said in-focus condition.

38. The system of claim 31, wherein said defocus value obtaining means comprises a charge coupled device.

39. The system of claim 31, wherein said instruction performing means comprises a processing unit.

40. The system claim 39, wherein said processing unit comprises a microprocessor.

41. The system of claim 31, wherein said photographic lens comprises a varifocal lens.

42. The system of claim 31, further comprising means for inhibiting the operation of a shutter until after said focus correction operation has been performed if said zooming lens group is shifted after said focusing lens group shifting means has been disabled.

43. An autofucusing system for a zoom camera, comprising:
a photographic lens that is selectively coupled to a camera body of said zoom camera, said photographic lens having a shiftable focusing lens group and a shiftable zooming lens group;
a first motor for shifting said focusing lens group;
a second motor for shifting said zooming lens group;
a lens memory for storing data pertaining to focusing characteristics of different focal length settings of said photographic lens;
means for obtaining a value representing a defocus amount and a defocus direction, said defocus value being obtained by light reflected off of an object to be photographed, and which passes through said photographic lens and falls onto a light sensitive detector;
a processor for executing instructions in response to said defocus value for operating said first motor to shift said focus lens group to obtain an in-focus condition, said processor disabling said first motor when said in-focus condition is obtained; and
means for operating said second motor to change said focal length setting of said photographic lens to re-obtain said in-focus condition, if desired, said processor re-enabling the operation of said first motor so as to perform a focusing correction operation based upon said data stored in said memory if said second motor was operated to shift said zooming lens group after said processor disable said first motor, said processor inhibiting the operation of a shutter in said zoom camera until said focus correction operation is completed if the execution of said focus correction operation is necessary.

44. An autofocusing system for a camera having a photographic lens including a focusing lens group and a zooming lens group, said system comprising:
means for detecting defocusing information;
means for driving said focusing lens group for focusing based upon said detected defocus information;

means for driving said zooming lens group for zooming:

focus lock means for disabling said focus-drive means once said photographic lens is brought into an in-focus condition; and re-focus means for enabling said focus drive means when said zooming lens group is driven by said zoom drive means after said focus drive means is disabled by said focus lock means, wherein defocus information detection is again executed by said defocus information detecting means said focus drive means is enabled by said re-focus means.

45. The autofocusing system according to claim 44, wherein said focusing lens group drive means comprises a pulse motor.

46. The autofocusing system according to claim 44, wherein said camera comprises a lens unit that is interchangeably mounted to a camera body.

* * * * *

UNITED STATES PATENT AND TRADEMARK OFFICE
CERTIFICATE OF CORRECTION

PATENT NO. : 5,066,968
DATED : November 19, 1991
INVENTOR(S) : N. SUZUKI et al.

It is certified that error appears in the above-indentified patent and that said Letters Patent is hereby corrected as shown below:

On the Title page, in section [56], "References Cited",

"U.S. PATENT DOCUMENTS", insert ---4,717,933  1/1988  Ando et al.  354/195.1---;
section [56], "References Cited", "FOREIGN PATENT DOCUMENTS", insert ---61-230111  10/1986  Japan---.

At column 17, line 36 (claim 10, line 9), change "diving" to ---driving---.
At column 19, line 51 (claim 31, line 29), change "operated" to ---operate---.
At column 19, line 55 (claim 31, line 33), change "executed" to ---execute---.
At column 20, line 58 (claim 43, line 30), change "disable" to ---disabled---.
At column 22, line 1 (claim 44, line 17), after "means" insert ---when---.
At Column 19, line 51, change "leans" to --lens--.

Signed and Sealed this

Twenty-fourth Day of December, 1996

Attest:

BRUCE LEHMAN

*Attesting Officer*   *Commissioner of Patents and Trademarks*